(12) United States Patent
Lee (10) Patent No.: US 12,399,701 B2
(45) Date of Patent: Aug. 26, 2025

(54) SYSTEM AND METHOD FOR CONTROLLING VEHICLE AND UPDATING SOFTWARE

(71) Applicants: Hyundai Motor Company, Seoul (KR); Kia Corporation, Seoul (KR)

(72) Inventor: Tae Ho Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 187 days.

(21) Appl. No.: 18/201,482

(22) Filed: May 24, 2023

(65) Prior Publication Data

US 2024/0045664 A1 Feb. 8, 2024

(30) Foreign Application Priority Data

Aug. 8, 2022 (KR) .................. 10-2022-0098724

(51) Int. Cl.
*G06F 8/65* (2018.01)

(52) U.S. Cl.
CPC ...................... *G06F 8/65* (2013.01)

(58) Field of Classification Search
CPC ....................................................... G06F 8/65
USPC ................................................. 717/168–178
See application file for complete search history.

(56) References Cited

U.S. PATENT DOCUMENTS

| | | | | |
|---|---|---|---|---|
| 5,835,911 A * | 11/1998 | Nakagawa | ............. | G06Q 30/06 707/999.203 |
| 6,324,691 B1 * | 11/2001 | Gazdik | ..................... | G06F 8/61 709/200 |
| 6,904,592 B1 * | 6/2005 | Johnson | .................... | G06F 8/65 705/52 |
| 6,978,152 B1 * | 12/2005 | Yamaashi | .............. | H04H 20/62 455/526 |
| 7,200,390 B1 * | 4/2007 | Henager | ................. | H04L 67/34 707/999.203 |
| 8,352,577 B2 * | 1/2013 | Martone | ................... | G06F 8/60 717/172 |
| 8,881,308 B2 * | 11/2014 | Baltes | ..................... | G06F 21/64 717/124 |
| 9,904,535 B2 * | 2/2018 | Gross | ..................... | G01R 31/44 |
| 10,831,468 B2 * | 11/2020 | Chatterjee | ............... | H04W 4/60 |
| 10,899,317 B1 * | 1/2021 | Moeller | .................. | B60R 25/30 |
| 11,709,666 B2 * | 7/2023 | Harata | ...................... | G06F 8/65 717/172 |
| 11,740,885 B1 * | 8/2023 | Fields | .................. | G05D 1/0214 717/172 |

(Continued)

OTHER PUBLICATIONS

Aust, "Vehicle Update Management in Software Defined Vehicles", IEEE, pp. 1-3 (Year: 2022).*

(Continued)

*Primary Examiner* — Anil Khatri
(74) *Attorney, Agent, or Firm* — Fox Rothschild LLP (57) ABSTRACT

A system for controlling a vehicle includes the vehicle for transmitting a software version and location information, and a server that selects a repeater capable of transmitting a new version of a software update package to the vehicle around the vehicle based on the location information when it is determined that update of software is necessary based on the software version received from the vehicle, and makes a request for the selected repeater to transmit the new version of the software update package to the vehicle.

14 Claims, 7 Drawing Sheets

(56) References Cited

U.S. PATENT DOCUMENTS

2014/0285146 A1* 9/2014 Huston ............... B60N 2/3015
320/109

OTHER PUBLICATIONS

Bhattacharjee et al, "Poster: Edge-Assisted Over-the-Air Software Updates", ACM, pp. 1-2 (Year: 2023).*
Lorch et al, "A Comprehensive, Automated Security Analysis of the Uptane Automotive Over-the-Air Update Framework", ACM, pp. 1-19 (Year: 2024).*
Toro-Betancur et al, "A Scalable Software Update Service for IoT Devices in Urban Scenarios", ACM, pp. 1-8 (Year: 2019).*
Bazzi et al, "A Novel Variability-Rich Scheme for Software Updates of Automotive Systems", IEEE, pp. 1-19 (Year: 2024).*
Plappert et al, "Secure and Lightweight Over-the-Air Software Update Distribution for Connected Vehicles", ACM, pp. 1-15 (Year: 2023).*

* cited by examiner

SYSTEM AND METHOD FOR CONTROLLING VEHICLE AND UPDATING SOFTWARE

CROSS-REFERENCE TO RELATED APPLICATION

This application claims, under 35 U.S.C. § 119(a), the benefit of priority to Korean Patent Application No. 10-2022-0098724, filed in the Korean Intellectual Property Office on Aug. 8, 2022, the entire contents of which are incorporated herein by reference.

BACKGROUND

1. Technical Field

The present disclosure relates to a system and a method for controlling a vehicle.

2. Background

Over the Air (OTA) refers to a technology of performing software updates of a vehicle controller wirelessly. The OTA generally has limitations in that it is difficult to use a local wireless network (Wi-Fi), thereby downloading an entire update package using a modem communication.

However, when the entire update package is downloaded via the modem communication, there is a limit in that excessive communication amount and communication charge are generated because of a great capacity of the entire update package. Accordingly, there is a need to develop a technology capable of downloading the update package using a wireless local network.

SUMMARY

The present disclosure has been made to solve the above-mentioned problems occurring in the prior art while advantages achieved by the prior art are maintained intact.

An aspect of the present disclosure provides a system and a method for controlling a vehicle that may download a vehicle software update package by utilizing a local wireless network.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a vehicle includes a communication device for transmitting a software version of a vehicle and location information of the vehicle, and a server that determines if an update to the software of the vehicle is necessary based on the software version of the vehicle, selects a repeater capable of transmitting a new version of a software update package to the vehicle. The selected repeater being within a transmission range of the vehicle and being selected based on the location information of the vehicle, and makes a request for the selected repeater to transmit the new version of the software update package to the vehicle.

In one implementation, the server may store the new version of the software update package.

In one implementation, the server may distribute the new version of the software update package to at least one repeater with certified security.

In one implementation, the repeater may be disposed in a place capable of minimizing a time it takes for the vehicle to download the new version of the software update package.

In one implementation, the server may search for a repeater candidate group around the vehicle, and select one repeater chosen from the repeater candidate group as the repeater capable of transmitting the new version of the software update package to the vehicle.

In one implementation, the server may preferentially select an electric vehicle charging station if the electric vehicle charging station and another vehicle are included in the repeater candidate group.

In one implementation, the server may preferentially select a closest vehicle from other vehicles that is closest to the vehicle if said other vehicles are included in the repeater candidate group.

In one implementation, the server may select one repeater in the repeater candidate group as the repeater capable of transmitting the new version of the software update package to the vehicle based on a user preference.

In one implementation, the vehicle may download the new version of the software update package from the selected repeater and execute the new version of the software update package, and transmit an update completion message to the server.

In one implementation, the server may determine the vehicle as the repeater candidate group when the update completion message is received from the vehicle.

According to another aspect of the present disclosure, a method for controlling a vehicle includes receiving a software version of a vehicle and location information of the vehicle, determining whether a software update of the vehicle is necessary based on the software version received from the vehicle, selecting a repeater capable of transmitting a new version of a software update package to the vehicle, the selected repeater being within a transmission range of the vehicle and being selected based on the received location information of the vehicle, and making a request for the selected repeater to transmit the new version of the software update package to the vehicle.

In one implementation, the method may further include storing the new version of the software update package.

In one implementation, the method may further include distributing the new version of the software update package to at least one repeater with certified security.

In one implementation, the repeater may be disposed in a place capable of minimizing a time it takes for the vehicle to download the new version of the software update package.

In one implementation, the method may further include searching for a repeater candidate group around the vehicle, and selecting one repeater chosen from the repeater candidate group as the repeater capable of transmitting the new version of the software update package to the vehicle.

In one implementation, the method may further include preferentially selecting an electric vehicle charging station if the electric vehicle charging station and another vehicle are included in the repeater candidate group.

In one implementation, the method may further include preferentially selecting one of other vehicles closest to the vehicle when said other vehicles are included in the repeater candidate group.

In one implementation, the method may further include selecting one repeater in the repeater candidate group as the repeater capable of transmitting the new version of the software update package to the vehicle based on a user preference.

In one implementation, the method may further include downloading, by the vehicle, the new version of the software update package from the selected repeater and executing the new version of the software update package, and transmitting an update completion message to a server.

In one implementation, the method may further include determining the vehicle as the repeater candidate group when the update completion message is received from the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
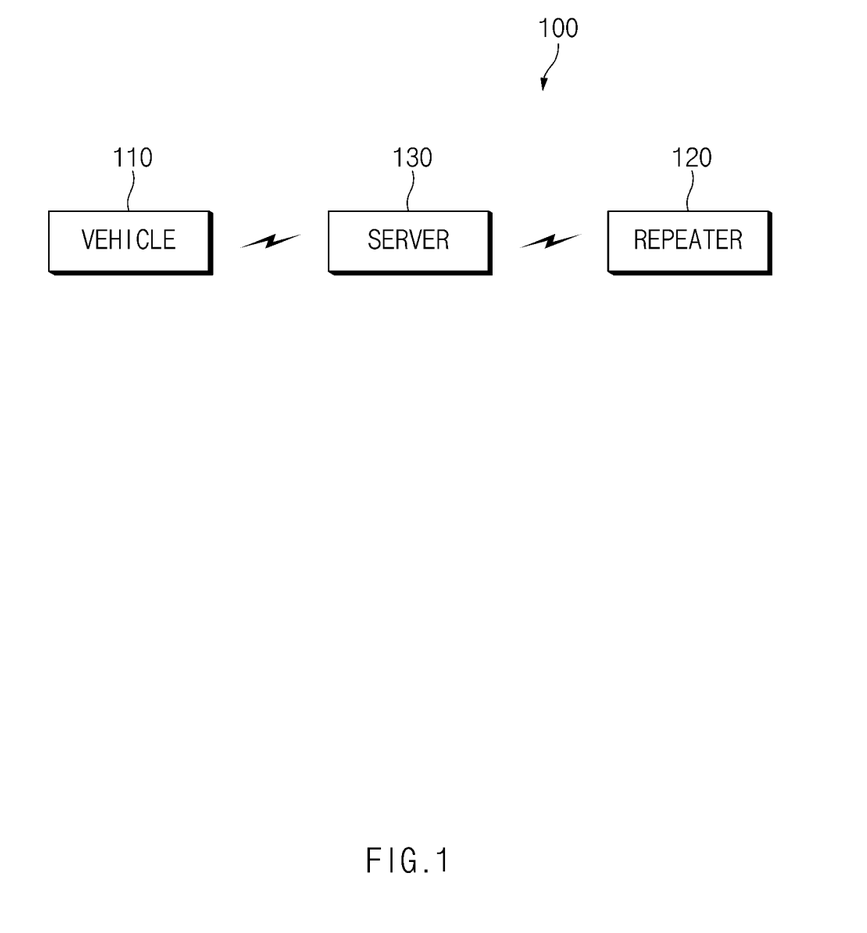
FIG. 1 is a diagram showing a configuration of a vehicle control system according to an embodiment of the present disclosure.

FIG. 1 is a diagram showing a configuration of a vehicle control system according to an embodiment of the present disclosure.

As shown in FIG. 1, a vehicle control system 100 may include a vehicle 110, a repeater 120, and a server 130.

The vehicle 110 may download a new version of a software update package from the repeater 120 or the server 130 and execute the new version of the software update package.

The repeater 120 may receive the new version of the software update package from the server 130. The repeater 120 may be disposed in a place that may minimize a time it takes for the vehicle to download the new version of the software update package via a wireless network (Wi-Fi). According to an embodiment of the present disclosure, the repeater 120 may be disposed in another vehicle, in the vehicle, or in an electric vehicle charging station in consideration of the time it takes for the vehicle to download the software update package. That is, as the repeater 120 is disposed in the electric vehicle charging station, the new version of the software update package may be downloaded and executed by utilizing a charging time of the vehicle. However, the present disclosure may not be limited thereto, and the repeater 120 may be disposed in not only the electric vehicle charging station or said another vehicle, but also a place where communication with the vehicle is easy.

The new version of the software update package received from the server 130 may be transmitted to the vehicle 110.

When receiving vehicle information from the vehicle 110 and determining that it is necessary to update software of the vehicle, the server 130 may select a repeater that may transmit the new version of the software update package to the vehicle 110 around the vehicle based on location information of the vehicle 110, and may make a request for the selected repeater to transmit the new version of the software update package to the vehicle. In various embodiments, the server 130 may select a repeater that is within a transmission range of the vehicle, i.e., the repeater is close enough to the vehicle that a successful transmission may occur. Furthermore, as used herein, the term "transmission" may encompass sending and/or receiving electronic information as that term would be broadly understood by a person of ordinary skill in the art.

Figure 2:
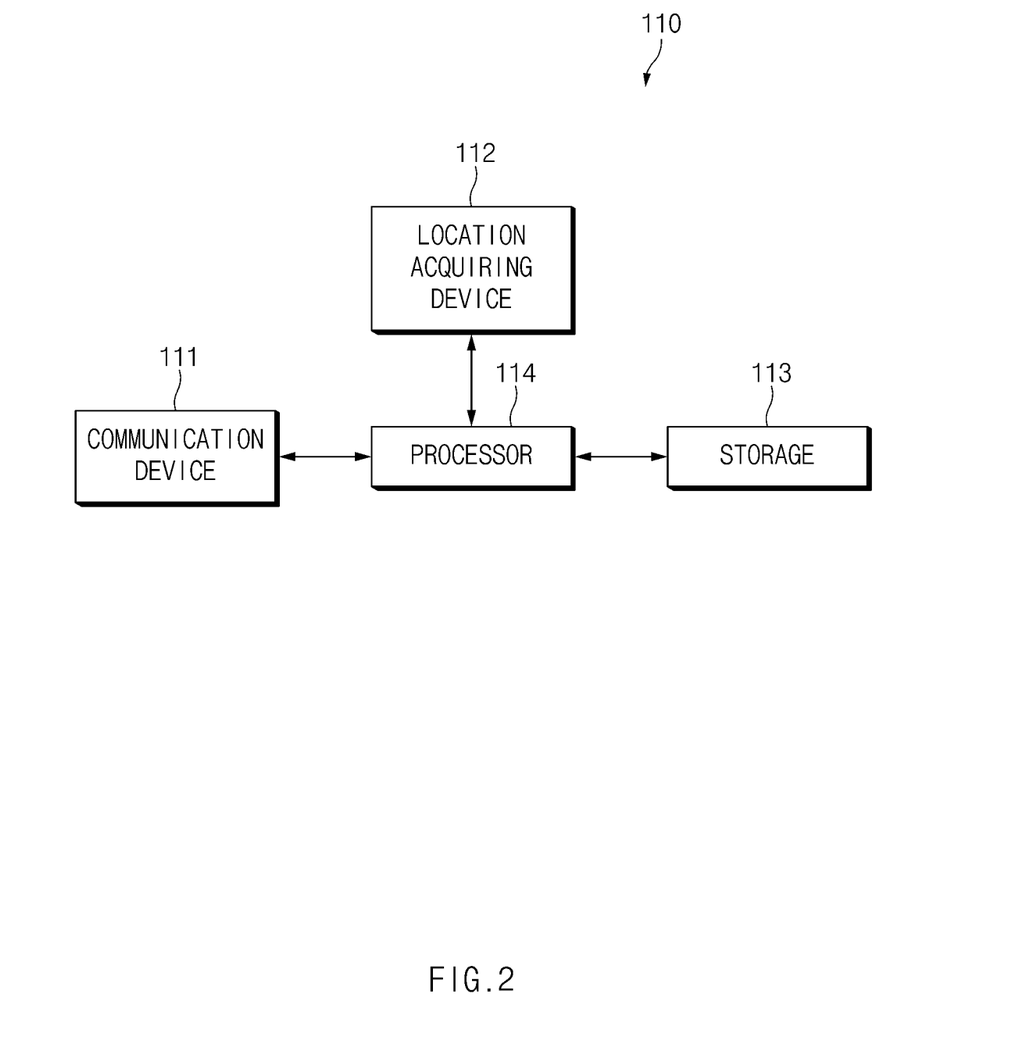
FIG. 2 is a diagram showing a configuration of a vehicle according to an embodiment of the present disclosure.

FIG. 2 is a diagram showing a configuration of a vehicle according to an embodiment of the present disclosure.

As shown in FIG. 2, the vehicle 110 may include a communication device 111, a location acquiring device 112, storage 113, and a processor 114.

The communication device 111 may perform wireless communication with the repeater 120 or the server 130. According to an embodiment, the communication device 111 may include a Wi-Fi communication device for performing Wi-Fi communication with the repeater 120, and may include a modem communication device for performing modem communication with the server 130.

The location acquiring device 112 may acquire the location information of the vehicle by having a GPS receiver, provide a map image of a certain region based on the location of the vehicle by map-matching the location of the vehicle to map data stored in advance, and provide a route from the current location to a destination.

The storage 113 may store at least one algorithm for performing operation or execution of various commands for an operation of the vehicle according to one embodiment of the present disclosure. The storage 113 may include at least one storage medium among a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 114 may be implemented by various processing devices such as a microprocessor having a built-in semiconductor chip capable of performing the operation or the execution of the various commands, and may control the operation of the vehicle according to one embodiment of the present disclosure.

Specifically, the processor 114 may transmit the vehicle information to the server 130. In this regard, the vehicle information may include a vehicle ID, a version of a software of a controller in the vehicle, and the location of the vehicle. According to an embodiment, the processor 114 may transmit the vehicle information to the server 130 via a secure channel using the modem communication device.

In addition, the processor 114 may download the software update package from the repeater 120 or the server 130 and execute the software update package, and may control an update completion message to be transmitted to the server 130 when the update is completed. According to an embodiment, after downloading the software update package from the server 130 using the Wi-Fi communication device and then, executing the same, the processor 114 may generate the update completion message and transmit the update completion message to the server 130. In this regard, the processor 114 may generate the update completion message including the vehicle ID, software version information, and the vehicle location.

Figure 3:
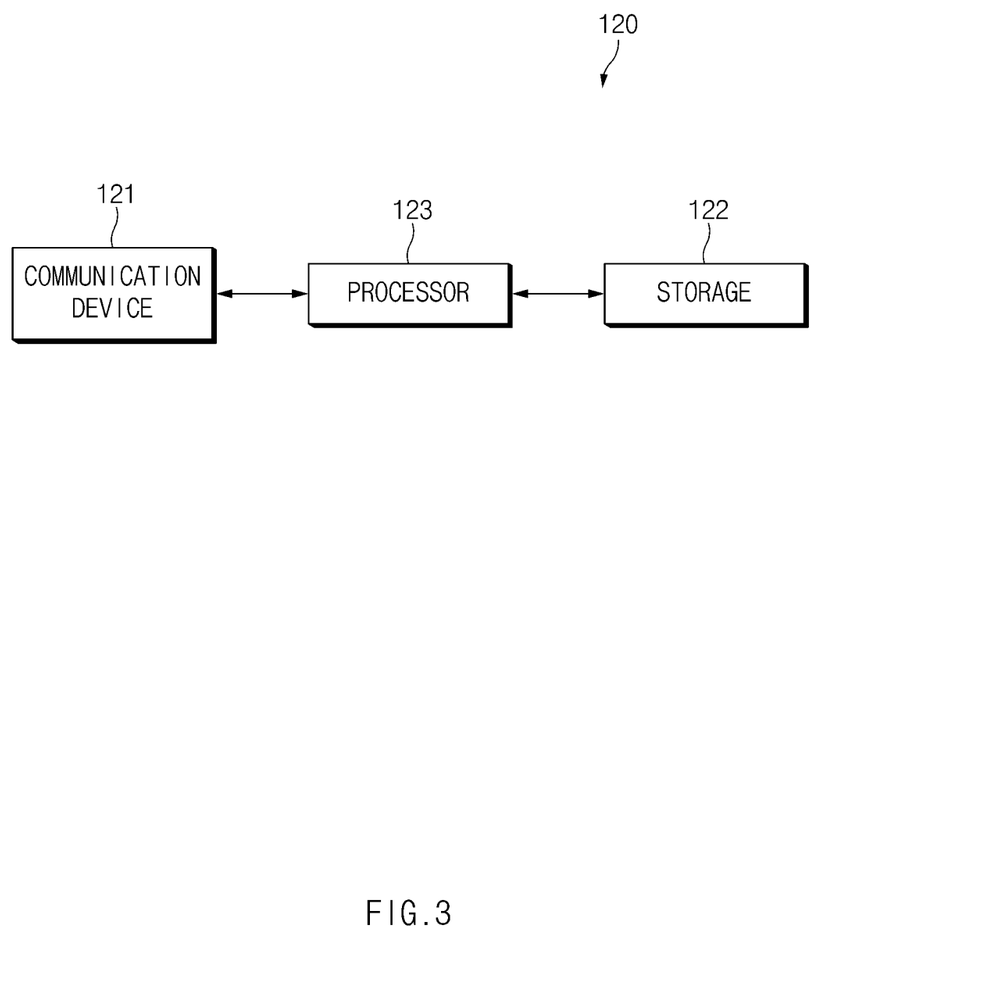
FIG. 3 is a diagram showing a configuration of a repeater according to an embodiment of the present disclosure.

FIG. 3 is a diagram showing a configuration of a repeater according to an embodiment of the present disclosure.

As shown in FIG. 3, the repeater 120 may include a communication device 121, storage 122, and a processor 123.

The communication device 121 may communicate in various wireless communication schemes, such as a Wi-Fi, a WiBro, a global system for mobile communication (GSM), a code division multiple access (CDMA), a wideband code division multiple access (WCDMA), a universal mobile telecommunication system (UMTS), a time division multiple access (TDMA), and a long term evolution (LTE). According to an embodiment, the communication device 121 may perform the Wi-Fi communication with the Wi-Fi communication device of the vehicle 110.

The storage 122 may store at least one algorithm for performing operation or execution of various commands for an operation of the repeater according to an embodiment of the present disclosure. The storage 122 may include at least one storage medium among a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 123 may be implemented by various processing devices such as a microprocessor having a built-in semiconductor chip capable of performing the operation or the execution of the various commands, and may control the operation of the repeater according to one embodiment of the present disclosure.

The processor 123 may receive the new version of the software update package from the server 130. In addition, when receiving the request to transmit the software update package received from the server 130 to the vehicle 110, the processor 123 may transmit the software update package to the vehicle 110. According to an embodiment, the processor 123 may transmit the software update package to the vehicle 110 via the Wi-Fi communication.

Figure 4:
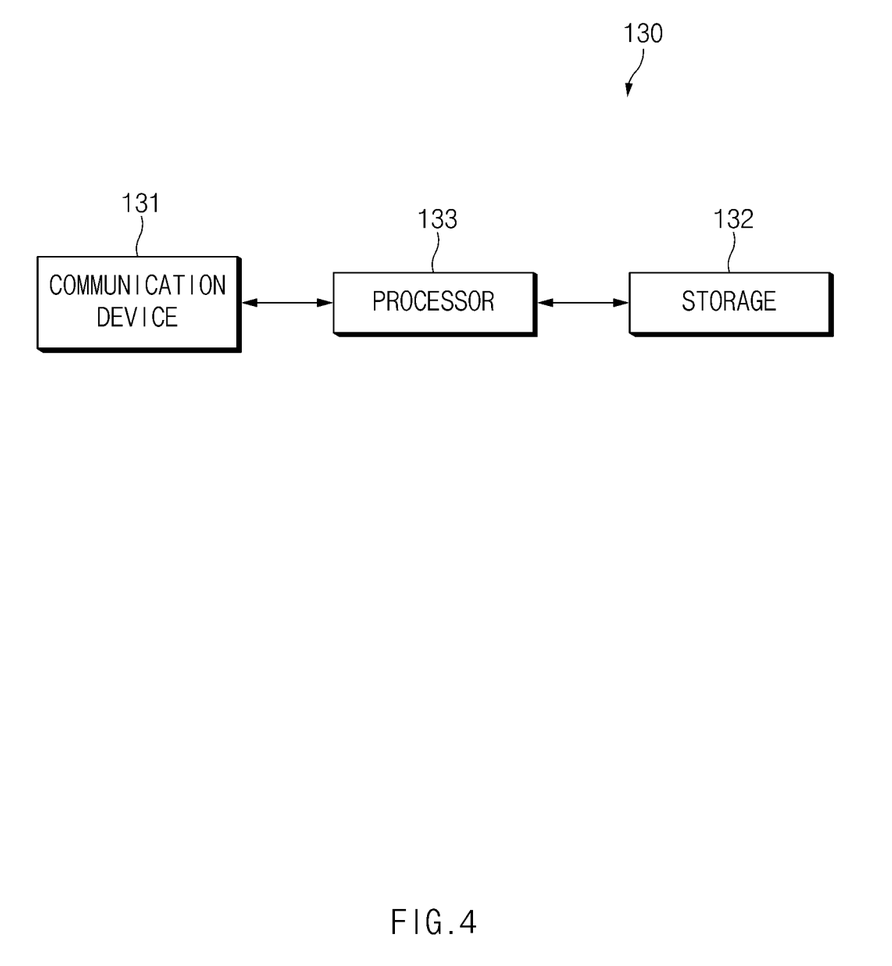
FIG. 4 is a diagram showing a configuration of a server according to an embodiment of the present disclosure.

FIG. 4 is a diagram showing a configuration of a server according to an embodiment of the present disclosure.

As shown in FIG. 4, the server 130 may include a communication device 131, storage 132, and a processor 133.

The communication device 131 may communicate in various wireless communication schemes, such as a Wi-Fi, a WiBro, a global system for mobile communication (GSM), a code division multiple access (CDMA), a wideband code division multiple access (WCDMA), a universal mobile telecommunication system (UMTS), a time division multiple access (TDMA), and a long term evolution (LTE). According to an embodiment, the communication device 131 may perform the modem communication with the modem communication device of the vehicle via the secure channel.

The storage 132 may store at least one algorithm for performing operation or execution of various commands for an operation of the server according to one embodiment of the present disclosure. The storage 132 may include at least one storage medium among a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 133 may store the new version of the software update package. The processor 133 may distribute (transmit) the new version of the software update package to the at least one repeater 120 with security certified.

The processor 133 may determine whether software upgrade of the controller in the vehicle 110 is required based on the vehicle information received from the vehicle 110. The processor 133 may receive the vehicle information via the modem communication with the vehicle 110, and when it is determined that the software upgrade is required, may determine the vehicle ID and the location information based on the vehicle information so as to determine a vehicle location at which the software update package will be transmitted.

The processor 133 may search for a repeater candidate group located around the vehicle 110 among repeaters to which the new version of the software update package is distributed. According to an embodiment, the processor 133 may search for an electric vehicle charging station or other vehicles around the vehicle 110 to which the new version of the software update package is distributed as the repeater candidate group.

When determining that the repeater candidate group has been searched, the processor 133 may determine whether there is a repeater capable of transmitting the software update package to the vehicle 110 in the searched repeater candidate group. When there is no repeater capable of transmitting the software update package to the vehicle 110 in the searched repeater candidate group, the processor 133 may allow the repeater candidate group to be re-searched or may generate a route to a repeater closest to the vehicle 110, and transmit the generated route to the vehicle 110.

The processor 133 may select a repeater to transmit the software update package to the vehicle 110.

According to an embodiment, when it is determined that the repeater to transmit the software update package to the vehicle 110 is disposed in the electric vehicle charging station and said another vehicle, the processor 133 may preferentially select the electric vehicle charging station.

In addition, when the repeater to transmit the software update package to the vehicle 110 is disposed in said other vehicles, the processor 133 may preferentially select one of said other vehicles closest to the vehicle 110 for a stable communication state.

In addition, the processor 133 may select the repeater to transmit the software update package to the vehicle 110 based on a user preference.

When the repeater to transmit the software update package to the vehicle 110 is selected, the processor 133 may make a request for the selected repeater 120 to transmit the software update package.

When the download and the execution of the software update package are completed and the update completion message is received from the vehicle 110, the processor 133 may determine the vehicle 110 as the repeater candidate group.

Figure 5:
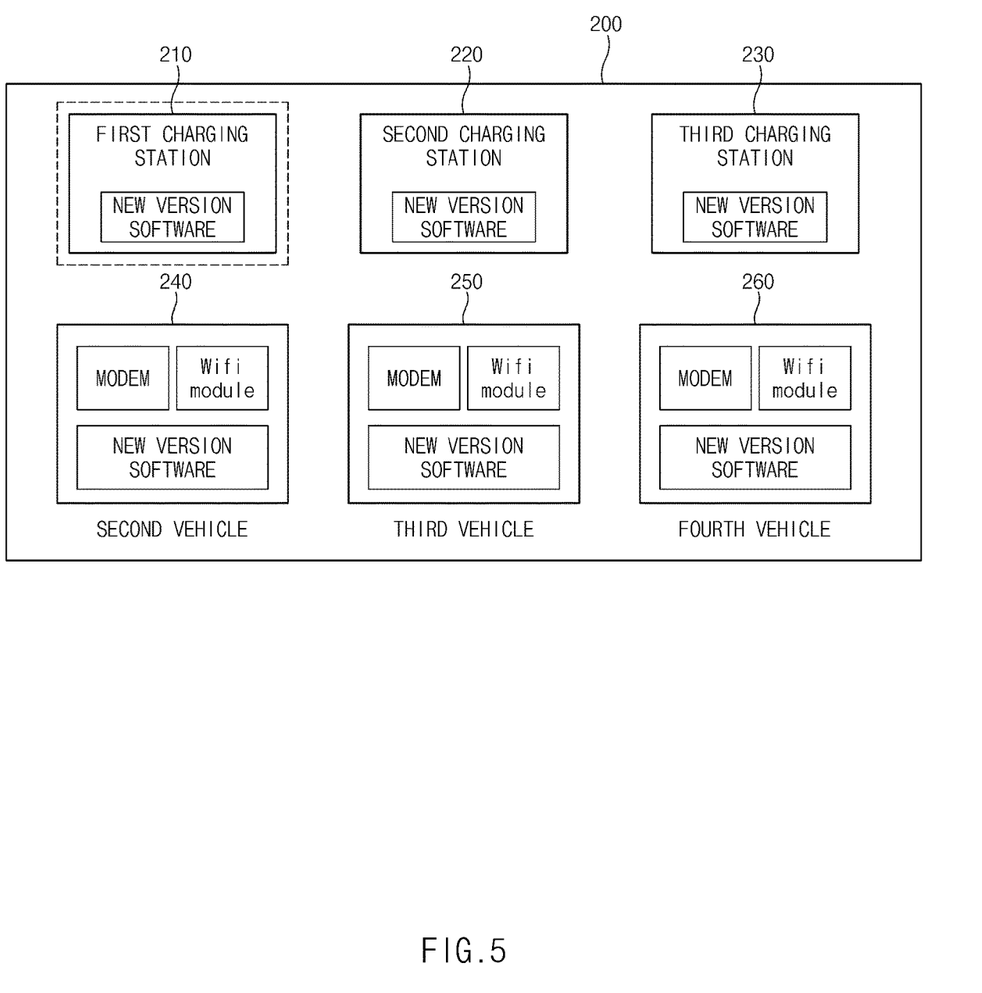
FIG. 5 is a diagram showing a repeater candidate group according to an embodiment of the present disclosure.

FIG. 5 is a diagram showing a repeater candidate group according to an embodiment of the present disclosure.

As shown in FIG. 5, according to an embodiment of the present disclosure, a repeater candidate group 200 that has received the software update package from the server 130 may include a plurality of charging stations (a first charging station 210, a second charging station 220, and a third charging station 230) and other vehicles (a second vehicle 240, a third vehicle 250, and a fourth vehicle 260). When it is determined that the repeater capable of transmitting the new version of the software update package to the vehicle 110 is disposed in the first charging station 210, the server 130 may select the first charging station 210, and make a request for the first charging station 210 to transmit the new version of the software update package to the vehicle 110.

Figure 6:
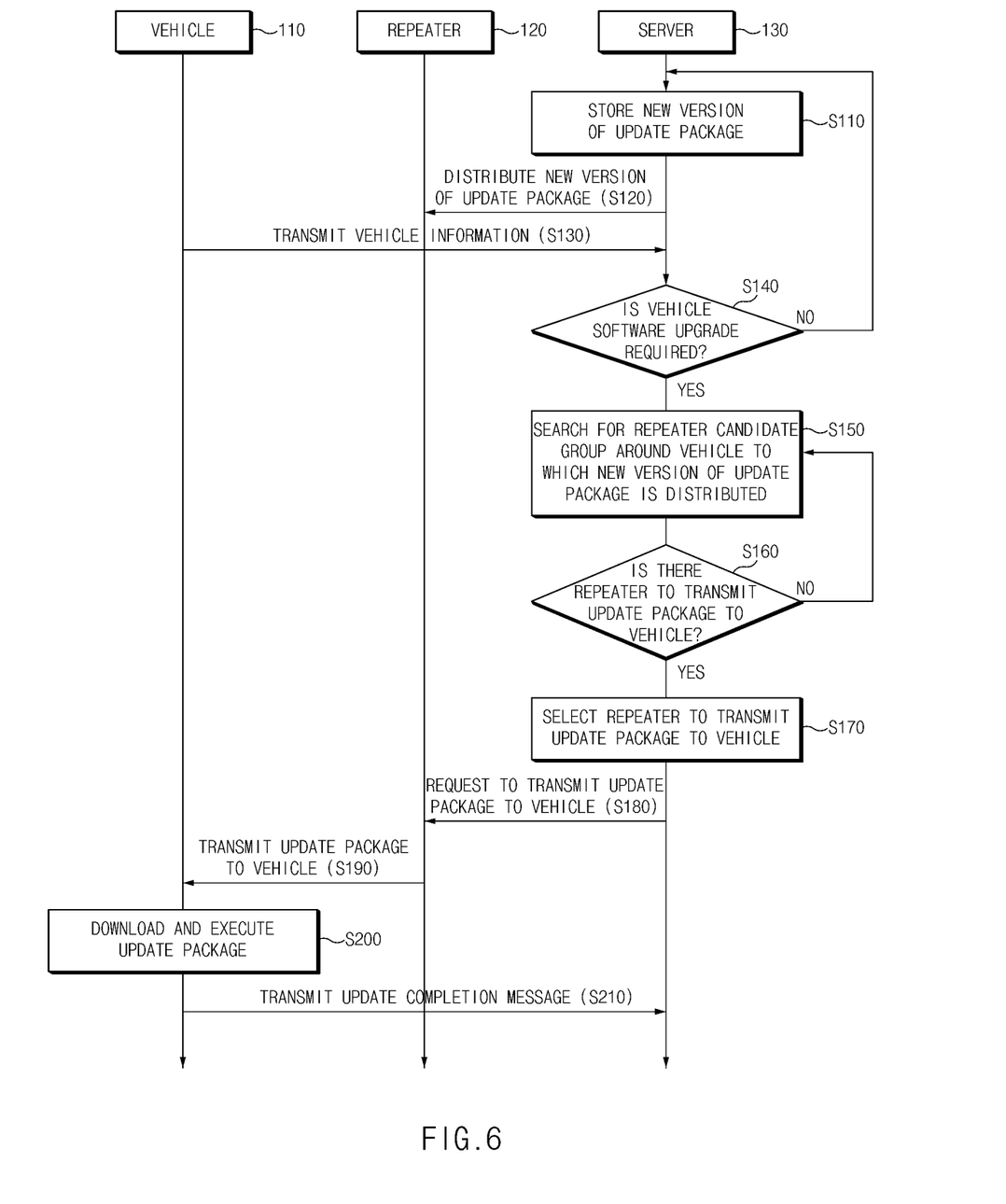
FIG. 6 is a diagram showing a vehicle control method according to an embodiment of the present disclosure.

FIG. 6 is a diagram showing a vehicle control method according to an embodiment of the present disclosure.

As shown in FIG. 6, the server 130 may store the new version of the software update package (S110). The server 130 may distribute (transmit) the new version of the software update package to the at least one repeater 120 with the security certified (S120). The repeater 120 may receive the new version of the software update package from the server 130.

The vehicle 110 may transmit the vehicle information to the server 130 (S130). In this regard, the vehicle information may include the vehicle ID, the software version of the controller in the vehicle, and the location of the vehicle. According to an embodiment, the vehicle 110 may transmit the vehicle information to the server 130 via the secure channel using the modem communication device.

The server 130 may determine whether the software upgrade of the controller in the vehicle 110 is required based on the vehicle information received from the vehicle 110 (S140). When it is determined that the software upgrade is required, the server 130 may determine the vehicle ID and the location information based on the vehicle information so as to determine the vehicle location at which the software update package will be transmitted.

The server 130 may search for the repeater candidate group located around the vehicle 110 among the repeaters to which the new version of the software update package is distributed (S150). According to an embodiment, the server 130 may search for the electric vehicle charging station or said other vehicles around the vehicle 110 to which the new version of the software update package is distributed as the repeater candidate group.

When determining that the repeater candidate group has been searched, the server 130 may determine whether there is the repeater capable of transmitting the software update package to the vehicle 110 in the searched repeater candidate group (S160).

When it is determined that there is the repeater capable of transmitting the software update package to the vehicle 110, the server 130 may select the repeater to transmit the software update package (S170).

According to an embodiment, in S170, when it is determined that the repeater to transmit the software update package to the vehicle 110 is disposed in the electric vehicle charging station and said another vehicle, the server 130 may preferentially select the electric vehicle charging station.

In addition, when the repeater to transmit the software update package to the vehicle 110 is disposed in said other vehicles, the server 130 may preferentially select one of said other vehicles closest to the vehicle 110 for the stable communication state.

In addition, the server 130 may select the repeater to transmit the software update package to the vehicle 110 based on the user preference.

When there is no repeater capable of transmitting the software update package to the vehicle 110 in the searched repeater candidate group, the server 130 may allow the repeater candidate group to be re-searched or may generate the route to the repeater closest to the vehicle 110, and transmit the generated route to the vehicle 110.

When the repeater to transmit the software update package to the vehicle 110 is selected, the server 130 may make a request for the selected repeater 120 to transmit the software update package (S180).

When receiving the request to transmit the software update package received from the server 130 to the vehicle 110, the repeater 120 may transmit the software update package to the vehicle 110 (S190). According to an embodiment, the repeater 120 may transmit the software update package to the vehicle 110 via the Wi-Fi communication.

The vehicle 110 may download the software update package from the repeater 120 or the server 130 and execute the software update package (S200). According to an embodiment, in S200, after downloading the software update package from the server 130 using the Wi-Fi communication device and then and executing the same, the vehicle 110 may generate the update completion message. The vehicle 110 may generate the update completion message including the vehicle ID, the software version information, and the vehicle location.

The vehicle 110 may transmit the update completion message to the server 130 when the update is completed (S210). When the download and the execution of the software update package are completed and the update completion message is received from the vehicle 110, the server 130 may determine the vehicle 110 as the repeater candidate group.

Figure 7:
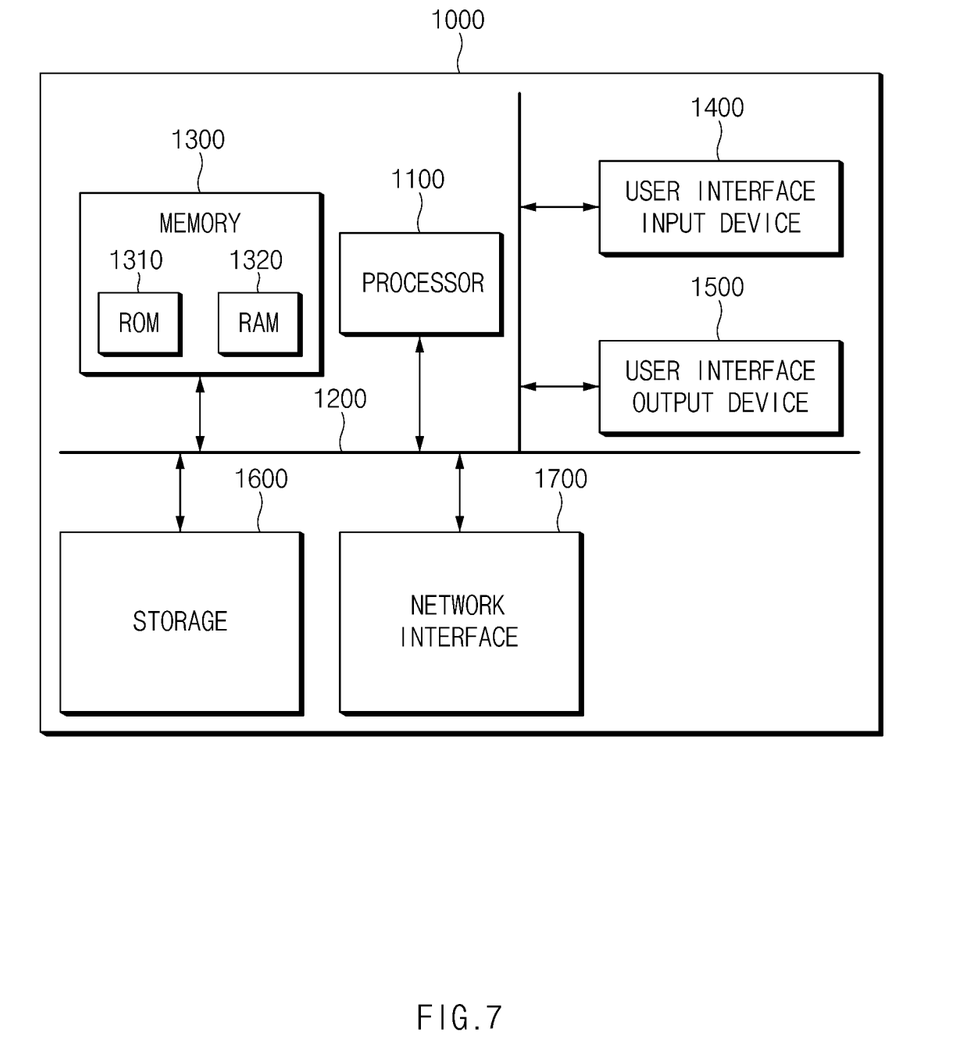
FIG. 7 is a diagram illustrating a configuration of a computing system executing a method according to an embodiment of the present disclosure.

FIG. 7 is a diagram illustrating a configuration of a computing system executing a method according to an embodiment of the present disclosure.

Referring to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The system and the method for controlling the vehicle according to one embodiment of the present disclosure may reduce a communication cost by downloading the vehicle software update package using the local wireless network as well as the modem communication.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for controlling a vehicle, the system comprising:
   the vehicle configured to transmit a software version of the vehicle and location information of the vehicle to a server; and
   the server configured to:
      determine if an update to the software of the vehicle is necessary based on the software version of the vehicle;
      select a repeater capable of transmitting a new version of a software update package to the vehicle, the selected repeater being within a transmission range of the vehicle and being selected based on the location information of the vehicle; and
      make a request for the selected repeater to transmit the software update package to the vehicle,
   wherein the repeater is disposed in a place capable of minimizing a time it takes for the vehicle to download the new version of the software update package, and
   wherein the server is configured to:
      search for a repeater candidate group around the vehicle;
      select one repeater chosen from the repeater candidate group as the repeater capable of transmitting the new version of the software update package to the vehicle to minimize the time it takes for the vehicle to download the new version of the software update package; and
      distribute the new version of the software update package to the one repeater with certified security.

2. The system of claim 1, wherein the server is configured to store the new version of the software update package.

3. The system of claim 1, wherein the server is further configured to preferentially select an electric vehicle charging station if the electric vehicle charging station and another vehicle are included in the repeater candidate group.

4. The system of claim 1, wherein the server is configured to preferentially select a closest vehicle from other vehicles that is closest to the vehicle if said other vehicles are included in the repeater candidate group.

5. The system of claim 1, wherein the server is configured to select one repeater in the repeater candidate group as the repeater capable of transmitting the new version of the software update package to the vehicle based on a user preference.

6. The system of claim 1, wherein the vehicle is configured to:
   download the new version of the software update package from the selected repeater and execute the new version of the software update package; and
   transmit an update completion message to the server.

7. The system of claim 6, wherein the server is configured to determine the vehicle as the repeater candidate group when the update completion message is received from the vehicle.

8. A method for controlling a vehicle, the method comprising:
   receiving a software version of the vehicle and location information of the vehicle;
   determining whether a software update of the vehicle is necessary based on the software version received from the vehicle;
   selecting a repeater capable of transmitting a new version of a software update package to the vehicle, the selected repeater being within a transmission range of the vehicle and being selected based on the received location information of the vehicle, wherein the repeater is disposed in a place capable of minimizing a time it takes for the vehicle to download the new version of the software update package;
   making a request for the selected repeater to transmit the new version of the software update package to the vehicle;
   searching for a repeater candidate group around the vehicle;
   selecting one repeater chosen from the repeater candidate group as the repeater capable of transmitting the new version of the software update package to the vehicle to minimize the time it takes for the vehicle to download the new version of the software update package; and
   distributing the new version of the software update package to the one repeater with certified security.

9. The method of claim 8, further comprising:
storing the new version of the software update package.

10. The method of claim 8, further comprising:
preferentially selecting an electric vehicle charging station if the electric vehicle charging station and another vehicle are included in the repeater candidate group.

11. The method of claim 8, further comprising:
preferentially selecting a closest vehicle from other vehicles that is closest to the vehicle if said other vehicles are included in the repeater candidate group.

12. The method of claim 8, further comprising:
selecting one repeater in the repeater candidate group as the repeater capable of transmitting the new version of the software update package to the vehicle based on a user preference.

13. The method of claim 8, further comprising:
downloading, by the vehicle, the new version of the software update package from the selected repeater and executing the new version of the software update package, and transmitting an update completion message to a server.

14. The method of claim 13, further comprising:
determining the vehicle as the repeater candidate group when the update completion message is received from the vehicle.

* * * * *